United States Patent [19]

Greenberg

[11] Patent Number: 4,639,779

[45] Date of Patent: * Jan. 27, 1987

[54] METHOD AND APPARATUS FOR THE AUTOMATIC IDENTIFICATION AND VERIFICATION OF TELEVISION BROADCAST PROGRAMS

[76] Inventor: Burton L. Greenberg, 28 E. 10th St., New York, N.Y. 10003

[*] Notice: The portion of the term of this patent subsequent to Mar. 26, 2002 has been disclaimed.

[21] Appl. No.: 786,983

[22] Filed: Oct. 15, 1985

Related U.S. Application Data

[63] Continuation of Ser. No. 476,915, Mar. 21, 1983, Pat. No. 4,547,804.

[51] Int. Cl.⁴ .................. H04N 7/087; H04N 7/08; H04N 7/00
[52] U.S. Cl. ...................... 358/142; 358/84; 358/147; 455/67
[58] Field of Search ............. 358/84, 86, 142, 147; 455/2, 67

[56] References Cited

U.S. PATENT DOCUMENTS

| | | | |
|---|---|---|---|
| 3,733,430 | 5/1973 | Thompson et al. | 358/84 |
| 3,919,479 | 11/1975 | Moon et al. | 358/84 |
| 4,025,851 | 5/1977 | Haselwood et al. | 358/84 |
| 4,230,990 | 10/1980 | Lert, Jr. et al. | 358/84 |
| 4,250,524 | 2/1981 | Tomizawa | 358/84 |
| 4,361,851 | 11/1982 | Asip et al. | 358/84 |
| 4,547,804 | 10/1985 | Greenberg | 358/84 |

Primary Examiner—James J. Groody
Assistant Examiner—Michael D. Parker
Attorney, Agent, or Firm—Davis Hoxie Faithfull & Hapgood

[57] ABSTRACT

An improved method and apparatus for identifying and verifying the proper airing of television broadcast programs wherein from the television broadcast, it can be assured that the programs were televised and received properly and aired at the scheduled time. The invention utilizes prerecorded or live video programs in which imprinted on a preselected scanning line is a digital encoded identifying number. These video programs with digital encoding are then distributed to network and/or local broadcast stations to be televised with this identification. A plurality of selected aired television channels are then automatically simultaneously monitored at a typical reception site whereby the encoded broadcast is appraised as to the quality of its audio and video, identified and timed, and which information is then stored for a later comparison to that which was actually intended to be aired.

11 Claims, 5 Drawing Figures

METHOD AND APPARATUS FOR THE AUTOMATIC IDENTIFICATION AND VERIFICATION OF TELEVISION BROADCAST PROGRAMS

This application is a continuation of copending patent application Ser. No. 476,915 filed Mar. 21, 1983 now U.S. Pat. No. 4,547,804 by Burton L. Greenberg.

BACKGROUND OF THE INVENTION

1. Field of Invention

This invention relates generally to an improved method and apparatus for automatically identifying and verifying television broadcast programs. More particularly, this invention relates to an improved method and apparatus in which the television programs are encoded with a digital identification code and then broadcast on a number of channels. These channels are automatically simultaneously monitored at a typical reception site and the encoded programs are checked for audio and video quality, identified and timed, and this information is then stored in a computer for later access and comparison with a main computer.

Television broadcast programs are comprised essentially of first run or syndicated feature programs and commercials, wherein said broadcast programs are either performed live or prerecorded for airing at certain times for specific stations. Commercials often consist of about a 30 second program which is inserted at various times during the viewing day by the station according to contracts made with the commercial owner or advertising agency. This is referred to as buying television time spots. Pursuant to a contract, the television station arranges to insert the commercial program in certain times arranged as part of that contract. For time to time, the television station then bills the buyer of the time spot for having aired the commercial. The practice over many years has been that a statement is made by the television station under oath to the effect that the commercials were aired at the times bought and that said airing was within the terms contracted. Upon receipt of the sworn statement and the bill, those documents are compared manually, and if they match the commercial time spot is paid for. However, not all commercials are aired properly and/or at the proper time. This occurs for many different reasons at each of the stations. It has become a practice to audit these airings by visual observation. Such auditing is very time consuming, labor intensive and tedious since it is necessary to monitor all of the channels in any particular area on a round the clock basis. Therefore, only samplings are done for auditing purposes. Such sample auditing is normally done under contract, and conducted by employees who record what they see on the television and return such records to their employer for collation and reporting. Because of the labor intensive nature of the sample auditing it is very expensive and not always reliable.

A further problem is that because auditing is not automated, there is a significant time delay in reporting and collating the audits. This delay impedes the advertiser from taking timely action to have any problems as to their commercial corrected. Thus the advertiser is unable to forestall continuous improper airing and wasteful television commercial time.

In addition, this delay in reporting and collating further delays the forwarding to the sworn statements on which payment of the advertising time relies. Therefore, there is a significant time lag for which payment is not made and this results in a loss of the use of the money during that delay time period.

While the foregoing has specifically discussed the particulars of identification and verification regarding commercials, similar problems exist for syndicated programing.

Thus, there is a long felt need for a quick, total verification of television broadcast programs, which would serve to upgrade the performance of the transmitting stations and confirm the program airing schedules.

DESCRIPTION OF THE PRIOR ART

Attempts at automatic program airing verification are known in the art. Methods have been developed for automatic identification systems of programs, including identification coding and pattern recognition, but these methods have substantial limitations and have not been satisfactory for verifying commercials.

Program identification coding methods have been divided into two general areas, audio and video encoding. Audio encoding (e.g. U.S. Pat. No. 3,845,391, Crosby) has proven to be unsatisfactory for television broadcasting. In the final report of the Ad Hoc Committee On Television Broadcast Ancillary Signals Of the Joint Committee On Intersociety Coordination (published May, 1978), the Journal Of The Society Of Motion Picture and Television Engineers found the aforementioned audio program identification to be extremely unreliable and caused significant degradation of program signal quality.

Previously proposed systems of video encoding would also be less than satisfactory for television commercials. In U.S. Pat. No. 4,025,851 to Haselwood et al. for network clearance monitoring, a 48 character digital code is placed onto the vertical blanking interval of line 20. While the use of line 20 reduced the degradation of the program signal quality, the encoding system used therein is overly complex and inadequate. This system utilizes a change line format for the handling of the data, which requires complex data processing, encoding, storage and verification. In addition, the system only monitors the broadcast of a single network and is unable to scan more than one channel. Moreover, only a method and system for the identification of the program is disclosed with there being no teaching as to the integration and recording of information as to the program's audio and visual quality.

SUMMARY OF THE INVENTION

Accordingly, one object of the present invention is to provide a novel and improved method and apparatus for automatic television broadcast program identification and verification.

Another object is to provide a novel and improved method and apparatus for automatic television broadcast program identification and verification that minimizes the amount of data processing required.

A further object is to provide a novel and improved method and apparatus for automatic television broadcast program identification and verification that can monitor more than one channel at a time.

This application provides a process for identifying and verifying the proper airing of television broadcast programs wherein there is an identifying code placed on each frame of each of the programs which code is not readily visible to a person viewing the same. The process provides for the receipt of the programs from transmitting stations for a number of selected channels and searching the frames of these aired programs to verify the presence of the identifying code, and if detected, the code is recorded for each frame read. The time of reading the first and last frame of the program is also recorded, and both the code and time information is directed to a memory. In addition to the above, the presence of proper audio and video is also determined. If the audio and video are proper, that information is also directed to a memory so that there is stored in that memory proof that the encoded program was aired with proper audio and video, at a certain time, and for a certain length of time. This information is identified as "verified airings" or verified signals. As a further part of the process, there is placed into another memory, a program airing schedule, which contains the aired time of day, the channels, and length of time of the program intended to be aired and the buyer of such network time. This information is identified as "bought airings" or reference signals. Thereafter, the "verified airings" are compared with the "bought airings" so as to produce an analysis of that which was bought to that which was actually properly aired.

BRIEF DESCRIPTION OF THE DRAWINGS

These and other objects and features of the invention will become apparent with reference to the following specification and to the drawings wherein.

DETAILED SPECIFICATION

Figure 1:
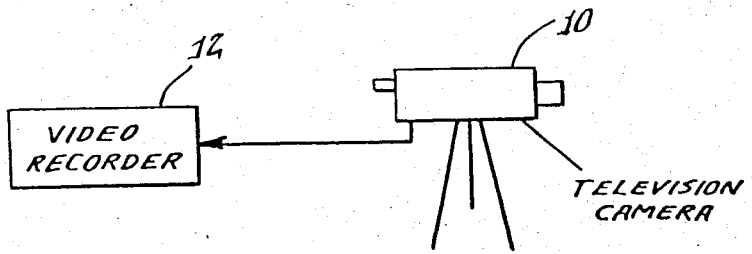
FIG. 1 is a block diagram of a video recording arrangement utilized in practicing the invention.

Referring now to FIG. 1, a video camera 10 is shown for generating a video signal having an informational content. The informational content comprises program matter such as a feature, commercial or other form of information which is to be transmitted by a television station in a market area to a receiving station in the area. The camera 10 includes means for generating a composite signal having a video information component and scanning control components. The latter include horizontal and vertical beam blanking components. The latter components, as is well-known, blank the electron beam in a cathode-ray tube at the receiving station during the retrace interval of the scanning electron beam. In accordance with the NTSC signal, the composite signal is transmitted at a nominal rate of 30 frames per second. Each frame comprises two interlaced fields and the nominal field rate is 60 fields per second. At the completion of each field, the beam is blanked by a vertical blanking signal and the beam retraces to restart a subsequent field. The composite video signal is coupled from the video camera 10 to a video recorder 12. The video information content of the program can thus be recorded on magnetic tape by the recorder 12, if so desired.

Figure 2:
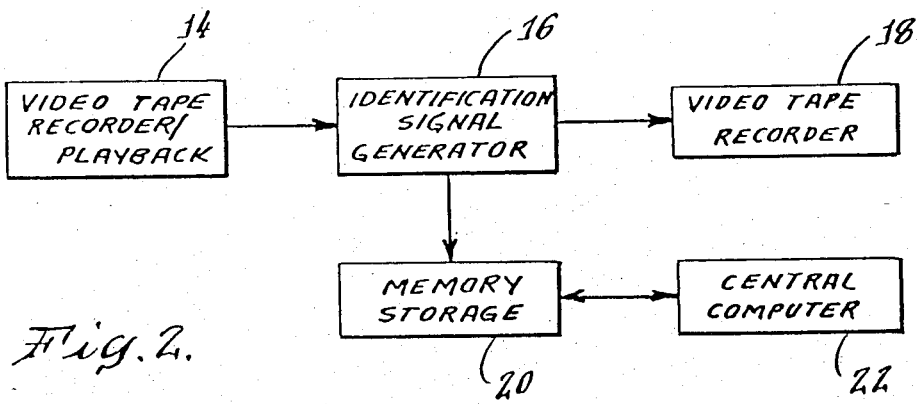
FIG. 2 is a block diagram of an arrangement for generating and combining an identification signal with a video signal.

The video program, if recorded, is copied at a dubbing studio. A number of copies of the program are made depending on the determined distribution requirements for the particular program. As illustrated in FIG. 2, the recorded program comprises a master tape which is loaded on a standard video tape playback apparatus 14, commercially available from the Ampex, Sony or RCA. The video signal which is read from the tape by this machine is coupled via an encoder and a character generator 16 to a video tape recorder 18. The encoder and character generator 16 strips out the video portion of line 20 of fields 1 and 2 and inserts a many bit signal identification component on line 20. The composite signal thus applied to the video recording apparatus 16 includes an identification component which identifies the video information. This identification code is also supplied to the storage means 20 of a computer means 22. The computer means 22 also stores additional information referenced by the identification code. Such information includes, for example, the name of the client on whose behalf the program is prepared, the name of the purchasers of the bought airings, or the service or product being advertised, etc. Use of this reference signal thus stored is described hereinafter.

Copies of the programs thus recorded are supplied to various television stations around the country for transmission in particular selected market areas. It will be appreciated that different programs having different video information identification codes are supplied to television stations in a same market area and at various times are transmitted over different communication channels to receiving stations in the market area.

While the above method of encoding has been described using prerecorded television broadcast programs, it is also possible to encode the signal for live broadcasts. In such as an arrangement the signal from the television camera 10 would be supplied directly to the identification signal generator 16 for encoding, and would then be transmitted directly without taping. Furthermore, the identification code would still be placed in the storage memory and computer 22 for later access and verification.

Figure 3:
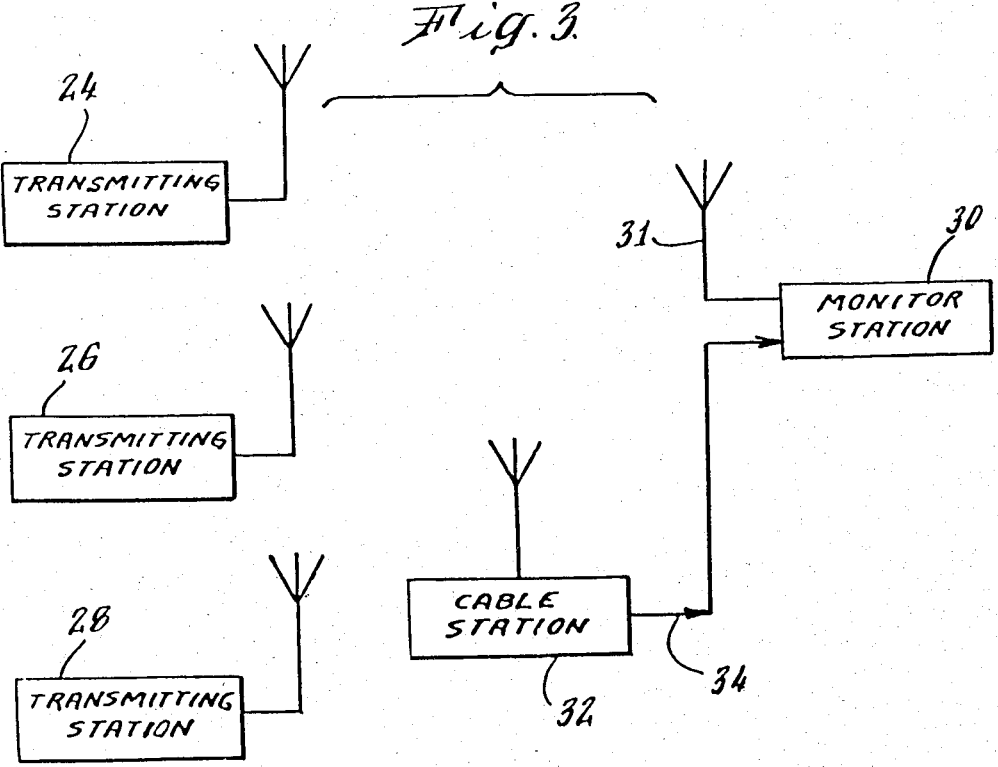
FIG. 3 is a diagram illustrating a plurality of sending stations for transmitting composite signals in a market area to a receiving station.

FIG. 3 illustrates three television sending stations 24, 26, and 28 which service a market area. Composite signal modulates RF carrier signals and are broadcast by the stations 24, 26, and 28. A monitoring receiving station 30 is provided in the market area and receives the different signals from stations 24, 26 and 28 by broadcast or by satellite communication. The signals received by cable station 32 are amplified and transmitted over a cable transmission line 34 to the monitor station 30 as well as to other receiving stations in the market area. For purposes of this specification and the appended claims, the term "transmit" refers both to broadcasting and to transmission of composite signals over transmission lines such as the cable 34.

Figure 4:
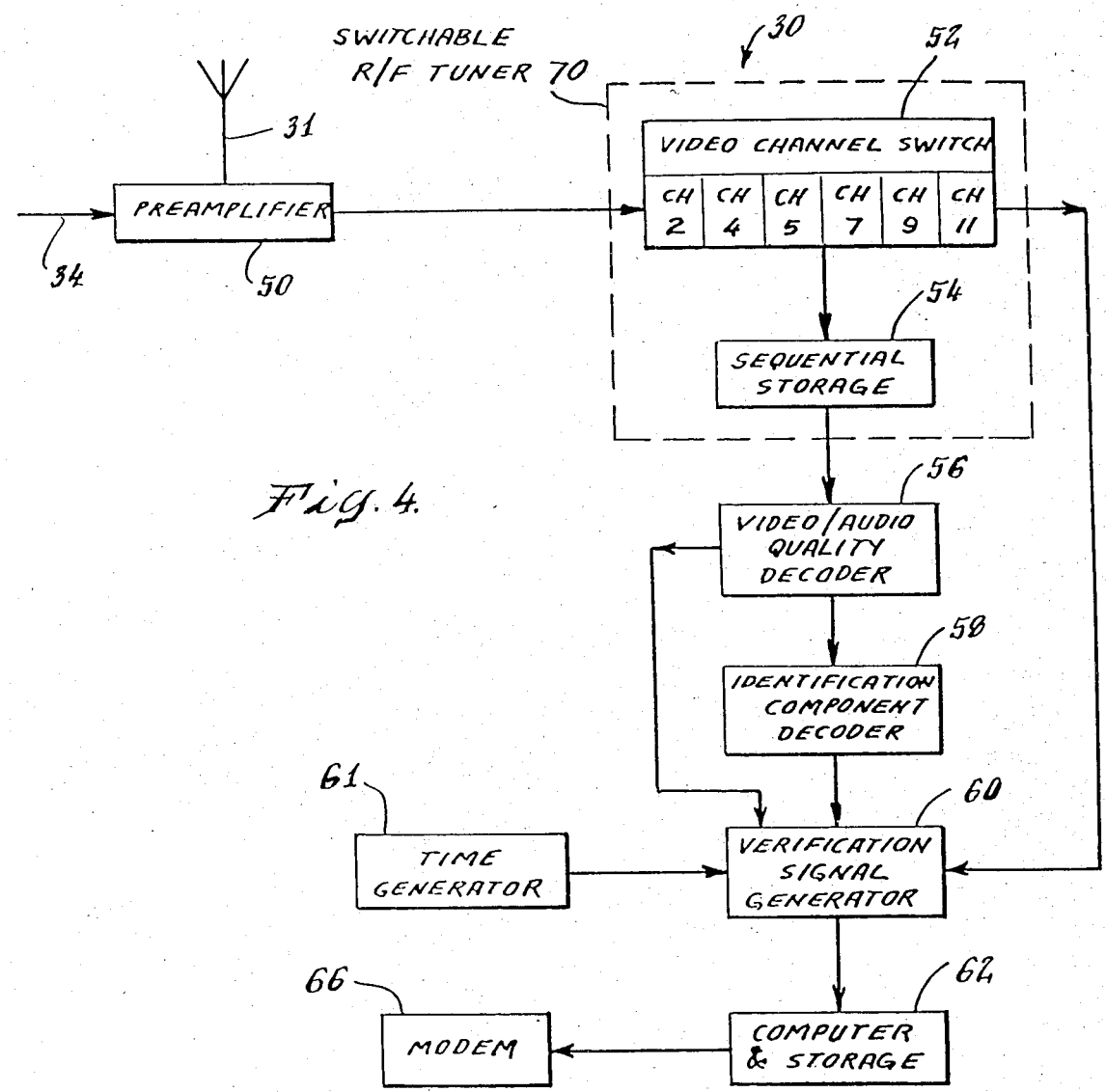
FIG. 4 is a diagram, partly in block form, of a receiving station in accordance with the invention; and, FIG. 5 is a diagram in block form of an arrangement for comparing a verification and reference signal.

As illustrated in FIG. 4, a broadcast signal which is induced in the antenna 31 or is received via the cable 34 at the monitor receiver station 30, is coupled by a preamplifier 50 to a switchable RF tuner 70. The switchable tuner 70 is comprised of a video channel switch 52, which, in the illustrated embodiment switches sequentially between six different T.V. communication channels. The channels illustrated are those for the metropolitan New York City, N.Y. area. Depending on the market being serviced, the switchable tuner 52 may include more or fewer channels as required. A suitable channel switch is available commercially from Channelmatic Inc., of Alpine, Calif. The channel switch 52 is switched sequentially among these channels at a rate for providing that each channel is scanned for a predetermined interval during a predetermined period of time. For example, each channel can be scanned for 1/10 second during each successive second. At a frame rate of 30 frames per second, 3 frames of the video information received on each channel are examined each second. The composite signal from these frames is then stored in a sequential storage means 54 within the switchable RF tuner 70. The sequential storage means 54 stores the composite signal from a switched channel for the period equivalent to the switching period. In the example given, three frames would be temporarily stored.

The composite signal thus stored and the associated audio signals are coupled to a video/audio quality detector 56 for sensing the level of the DC component of the signals and for generating an output signal indicative of video and audio quality. A presence detector of this type is commercially available from Channelmatic Inc., of Alpine, Calif. The composite signal is subsequently applied to an identification component detector 58 which detects the identification component on line 20 and supplies the digital code thus detected to a verification signal generator 60. The output signal of detector 56 indicating video and audio quality is also supplied to generator 60.

Input signals to the verification signal generator 60 thus comprise the digital identification code, the signal indicative of video and audio quality and a signal from a time signal generator 61 which indicates the date, the time of day, and the length of time for which the identification code was decoded. Such time signal generation is well known in the art, and one such time code generator is commercially available from Datum Inc., of Anaheim, Calif.

In addition, the channel switch 52 generates and provides an electrical indication of the particular channel on which the detected identification code was received. The verification signal produced on generator 60 thus includes the identification code, the channel identification, the time information, and an indication as to the video and audio quality of the transmitted signal. The verification signal is thus applied to the storage means of a local computer means 62. The computer 62 stores this information until such time as it is queried by the central computer 22.

The assembly of this verification bought airing information is accomplished within the predetermined scanning interval which in this example is 1/10 second. In a different embodiment this predetermined interval could be 1/30 second or less, depending on the accuracy of verification that is desired.

When the assembly of this information is complete, the video channel switch 52 automatically switches to the next selected channel, restarting the identification process. The process is subsequently repeated for all those selected channels wherefore it returns to first monitored channel to start the identification process over for the next consecutive second.

Figure 5:
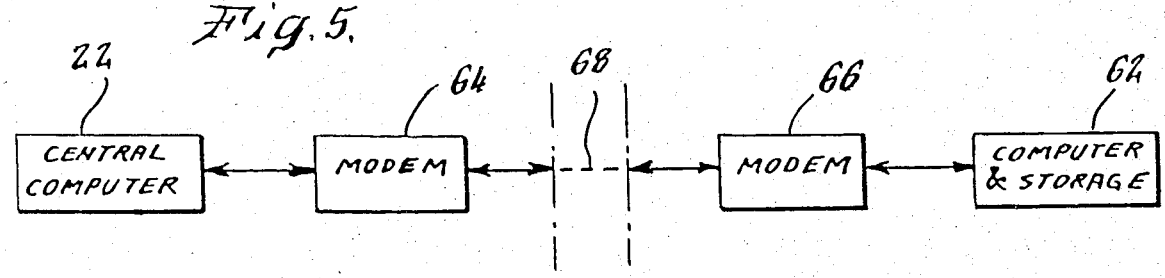

FIG. 5 illustrates communication between the central computer 22 and the computer 62. Each of these computers is coupled via modems 64 and 66 to a telephone transmission line 68. At a predetermined time, either on a daily, bi-daily or other time basis, the central computer 22 generates an inquiry signal which causes the computer 62 to transmit the verification signals which it has stored over a period of time from the station 30 to the central computer 22. The central computer 22 compares the verification signals with the stored reference signals thus verifying the transmission and quality of the transmitted signals. Reference signals stored in the central computer 22 for which no verifying signal is present are indicated to have been not transmitted, and appropriate follow-up action can then be taken. While a single market area was illustrated with respect to the transmitting and receiving stations of FIG. 3, the central computer 22 can sequentially query receiving stations in a number of different market areas, and thus provides a means for centrally correlating information with respect to the transmission of signals throughout the country.

The method and apparatus thus described are advantageous in that comprehensive auditing of transmitted video information is automatically accomplished. The automatic auditing is accomplished economically and rapidly thus enabling prompt follow-up of indications of faulty transmission that are received. The prompt follow-up also enhances the billing and payment for aired time.

While there has been described a particular embodiment of the invention, it will be apparent to those skilled in the art that variations may be made thereto without departing from the spirit of the invention, and the scope of the appended claims.

I claim:

1. A method for automatically identifying and verifying the proper airing of a television program which has an identification code recorded on a selected line of each frame of the program and which is transmitted as a composite signal from one or more sending stations at one or more times over one or more channels for reception in a receiving area, comprising the steps of:
    (a) storing reference signals in a first memory means, each of said reference signals containing information referenced to said identification code specifying a bought airing of the program identified thereby;
    (b) receiving each of the composite signals of said channels;
    (c) automatically scanning said channels to detect the presence of said identification code and of a proper audio and video portion of each received composite signal which includes said identification code;
    (d) separating the detected identification code from each of said received composite signals;
    (e) generating an electrical time signal;
    (f) generating a channel identifying signal;
    (g) forming with said time signal and said channel identifying signal a separate verification signal for each separated identification code, said verification signal including information specifying said separated identification code and the time and channel of receiving said program;
    (h) storing each said verification signal in a second memory means to identify a verified airing of said program; and
    (i) comparing verified airings information from said second memory means with bought airings information from said first memory means and making therefrom a list of the number of verified airings that were bought airings and the number of bought airings for which there is no verified airing.

2. The method of claim 1 wherein said identification code comprises a digital signal.

3. The method of claim 2 wherein said digital signal is encoded on line 20 of fields 1 and 2.

4. The method of claim 1 further including the steps of sensing an electrical characteristic of each said received composite signal which includes an identification code to determine the quality of the video portion thereof and storing an electrical signal in said second memory means indicating the video quality of each said received composite signal.

5. The method of claim 1 further including the steps of sensing an electrical characteristic of each said received composite signal which includes an identification code to determine the quality of the audio portion thereof and storing an electrical signal in said second memory means indicating the audio quality of each said received composite signal.

6. The method of claim 1 wherein said time signal indicates the date and time of day at which said identification code was received.

7. The method of claim 1 wherein the step of automatically scanning the channels includes periodically sequentially scanning each channel for a predetermined interval of time which interval includes a plurality of frames.

8. The method of claim 1 wherein the number of scanned channels is more than one.

9. In a system for verifying the transmission of a program from one or more sending stations over a plurality of communication channels for reception within a reception area, said program including a composite electrical signal having a video information component and a scanning control component, said video component including a periodically recurring identification component encoded to identify the informational content of said video component, apparatus for verifying the transmission of the program by the sending stations, comprising:
 (a) means for storing reference signals, each including information referenced to said identification component specifying a bought airing of said program;
 (b) signal receiving means for receiving the composite signals of said plurality of channels;
 (c) means for scanning said received composite signals for detecting reception of composite signals including said identification component;
 (d) means for separating the identification component from the detected composite signal;
 (e) means for generating an electrical time signal;
 (f) means for generating a channel identifying signal;
 (g) means for forming separate verification signals for each reception of said program by combining said separated identification component, said time signal and said channel identifying signal;
 (h) means for storing each said verification signal;
 (i) means for comparing verification information from said verification signal storing means to said reference signals; and
 (j) means for providing an indication upon correspondence between said verification information and said reference signals for verifying the transmission of said program by said sending stations.

10. A method for automatically identifying and verifying the proper airing of television programs each having a unique identification code on a selected line of each frame thereof which are transmitted as composite signals from one or more sending stations over a plurality of channels for reception in a receiving area comprising the steps of:
 (a) receiving the composite signal transmitted on each of said channels;
 (b) scanning automatically over said channels to detect the presence of one of said identification codes;
 (c) separating the detected identification code from the received composite signal of each of said programs;
 (d) forming a separate verification signal for each separated identification code, said verification signals identifying the time and channel of reception of the composite signals of each of said programs; and
 (e) comparing said verification signals with prerecorded reference signals identifying bought airings of said programs to verify said airings.

11. A method for automatically identifying and verifying the proper airing of television programs having a video and audio information portion and a individual identification code recorded on a selected line of each frame of the video portion thereof, said identification code being unique for each program, which programs are transmitted from a plurality of sending stations as composite signals for reception in a receiving area, comprising the steps of:
 (a) storing reference signals in a first memory means, said reference signals containing individual bought airings information for each of said programs referenced to the corresponding identification code;
 (b) receiving the composite signals transmitted on each of said channels;
 (c) detecting automatically the presence of the identification codes in programs received on each of said channels;
 (d) separating the detected identification codes from the composite signals of each of said programs;
 (e) sensing the whether a proper audio portion is present in said programs;
 (f) generating electrical time signals and channel identifying signals;
 (g) forming separate verification signals for each detected identification code indicating the airing of the corresponding program on one of said channels, each of said verification signals including said identification code and the time, channel and audio quality of said corresponding program;
 (h) storing said verification signals in a second memory means; and
 (i) comparing said verification signals from said second memory means with said reference signals from said first memory means.

* * * * *